United States Patent [19]

Hetzer et al.

[11] Patent Number: 4,905,568
[45] Date of Patent: Mar. 6, 1990

[54] EJECTOR MECHANISM FOR AN AMMUNITION CARRIER

[75] Inventors: Walter Hetzer, Ottobrunn; Erwin Goellner, Oberpframmern, both of Fed. Rep. of Germany

[73] Assignee: Messerschmitt-Boelkow-Blohm GmbH, Munich, Fed. Rep. of Germany

[21] Appl. No.: 331,520

[22] Filed: Mar. 30, 1989

[30] Foreign Application Priority Data

Apr. 19, 1988 [DE] Fed. Rep. of Germany ....... 3813048

[51] Int. Cl.$^4$ ............................ B64D 1/04; F41F 5/02
[52] U.S. Cl. ...................................... 89/1.51; 89/1.54; 244/137.4
[58] Field of Search ...................... 89/1.51, 1.54, 1.57, 89/1.8; 244/137.4

[56] References Cited

U.S. PATENT DOCUMENTS

| | | | |
|---|---|---|---|
| 4,343,447 | 8/1982 | Reed | 244/137.4 |
| 4,377,103 | 3/1983 | Kovalenko | 89/1.51 |
| 4,388,853 | 6/1983 | Griffin et al. | 244/137.4 |
| 4,552,327 | 11/1985 | Carter | 89/1.54 |

FOREIGN PATENT DOCUMENTS 0242290 10/1987 European Pat. Off. .

Primary Examiner—David H. Brown
Attorney, Agent, or Firm—W. G. Fasse; D. H. Kane, Jr.

[57] ABSTRACT

An ejecting mechanism for an ammunition body is operated by pressurized gas from a high pressure bottle for pressurizing a double piston, which controls two ejectors through a hydraulic valve system. The pressurized gas is heated by a heater surrounding the high pressure bottle to keep the bottle and its content at a temperature that corresponds approximately to the highest outer temperature under which the ejector mechanism is expected to operate. Thus, the pressurized gas has the same energy content at all expected external operating temperatures. After an ammunition body has been ejected, the ejector pistons are pushed back again under an electrical control signal from a control which controls the valve system, whereby the hydraulic oil is pressed back into a hydraulic reservoir. The ejector pistons are of the stepped type to facilitate the intended operation. A high pressure pump pumps the hydraulic oil back into the double piston cylinder device, whereby the respective double piston drives the working or driving gas back into the high pressure bottle, thereby reactivating the system for the next ejection.

12 Claims, 2 Drawing Sheets

4,905,568

EJECTOR MECHANISM FOR AN AMMUNITION CARRIER

FIELD OF THE INVENTION

The invention relates to an ejector mechanism for an ammunition carrier. The ejector mechanism has a double piston system operated by a pressurized gas. The double piston system cooperates with two ejectors which in turn are actuated by hydraulic liquid under pressure.

BACKGROUND INFORMATION

European Patent Publication No. EP-A 0,242,290 discloses such an ejector mechanism, wherein the ejector is driven by a pressurized gas produced by a pyrotechnical generator. Rather than producing the pressurized gas by a generator, it is also possible to supply the pressurized gas by means of a high pressure gas bottle. However, the temperature of the pressurized gas entering into the working cylinder depends on the outside temperature. Thus, the temperature of the pressurized gas may vary considerably. Due to the long conduit from the pyrotechnical gas generator to the working cylinder, the produced pressurized gas cools down as a function of the outside temperature so that said cooling may be substantial. Additionally, the cooling of the pressurized gas is subject to substantial variations. When the pressurized gas is supplied by a high pressure bottle, the gas temperation also depends completely on the outside temperature.

However, an ejector mechanism of this type requires a certain well defined energy for performing the ejection. Such energy is determined by the mass of the ammunition body to be ejected.

The energy needed for the ejection is further dependent on the required ejection speed. Thus, the gas generator or the high pressure gas bottle must be so constructed and dimensioned that the required energy will be made available even at the lowest possible temperature, or rather outside temperature under which the mechanism is expected to perform its function. Such minimum temperatures may well be in the range of, for example $-50°$ to $-60°$ C. By satisfying this minimum temperature requirement, the known system normally will provide excess energy when an ammunition body is to be ejected under normal external temperature condition in the range of, for example $+40°$ to $+70°$ C. Thus, the available energy is normally not utilized and the pressure on the ejector piston is unnecessarily large. As a result, the reaction forces that must be taken up can have detrimental effects, for example, on the air frame of an aircraft which must take up these reaction forces.

Another disadvantage of the known mechanism is seen in that the pressurized gas is used up without any recovery so that new pressurized gas must be made available for each successive ejection of an ammunition body from the ammunition carrier.

OBJECTS OF THE INVENTION

In view of the foregoing, it is the aim of the invention to achieve the following objects singly or in combination:

to construct an ejection mechanism of the type described above in such a way that the pressurized gas supply will be independent of the prevailing outer temperature;

to utilize the pressurized gas repeatedly so as to make the mechanism more efficient; and to avoid over-dimensioning the high pressure gas bottle, thereby reducing its weight and diminishing any reaction forces that need to be taken up, for example, by an air frame.

SUMMARY OF THE INVENTION

The ejector mechanism according to the invention is characterized in that the pressurized driving gas is heated to a uniform operating temperature, and in that after the ejection of the ammunition body the ejector pistons are again pulled back hydraulically for reactivating the pressurized driving gas.

Advantages of the invention are seen in that the heated pressurized driving gas always contains the same energy content for the ejection of an ammunition body independently of the outer or external temperature. As a result, the high pressure gas bottle for supplying the pressurized driving gas can be dimensioned exactly for its intended purpose without any need for an excessive dimension. As a result, its weight is reduced and the reaction forces caused by the ejection are always the same which is advantageous for the air frame structure, rather than dependent on the outer temperature. Another important advantage of the invention is seen in that due to the use of a high pressure pump, the hydraulic liquid flowing back into the hydraulic liquid reservoir from the ejector cylinders can push back the double control piston, thereby again compressing the operating or driving gas by returning it under pressure into the high pressure bottle. Due to the arrangement of the hydraulic valves, and the electrical control means for these valves, an automatic operational sequence of the three operations performed by the mechanism is possible, namely pushing out the ejector piston, pushing back the ejector piston, and reactivating the ejector mechanism including the reactivation of the driving gas.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
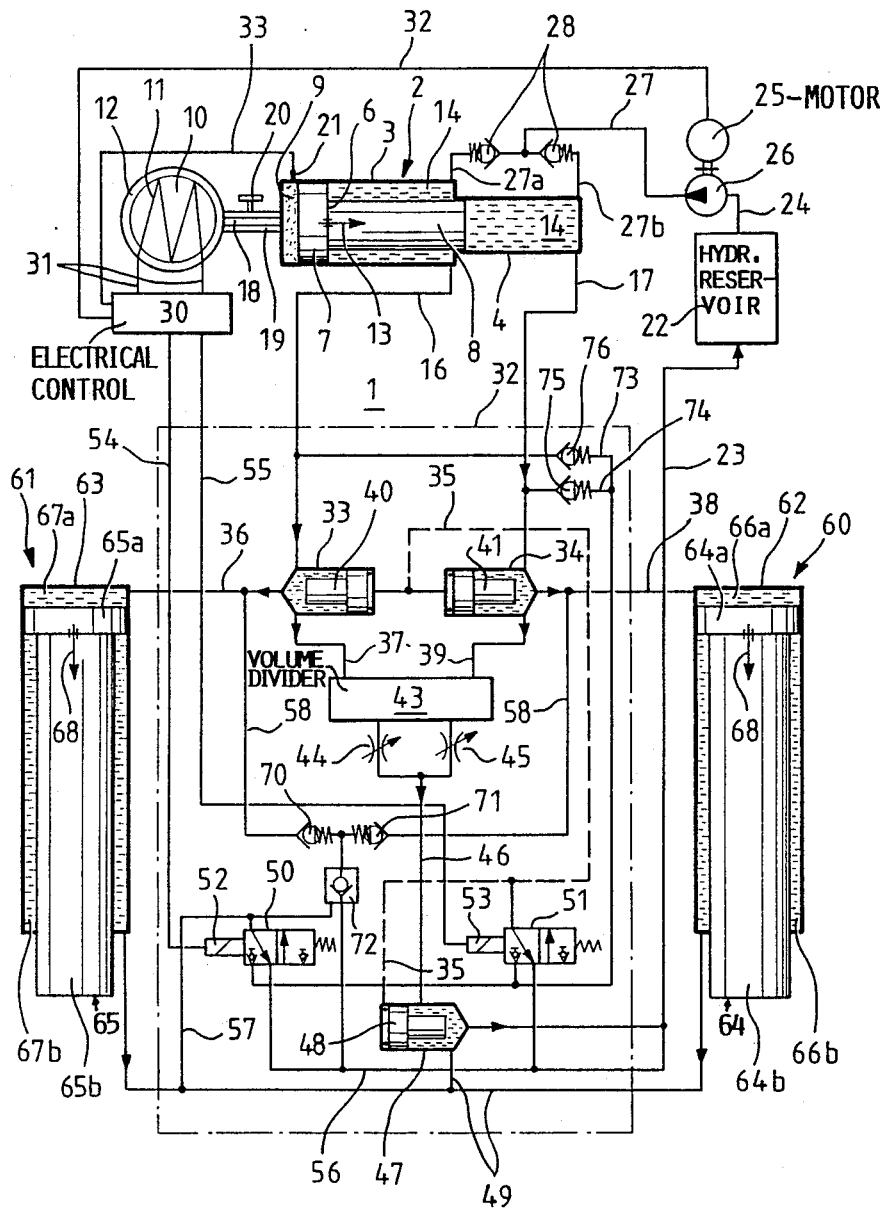
FIG. 1 shows the present ejector mechanism at the beginning of the outward movement of the ejector pistons.
Figure 2:
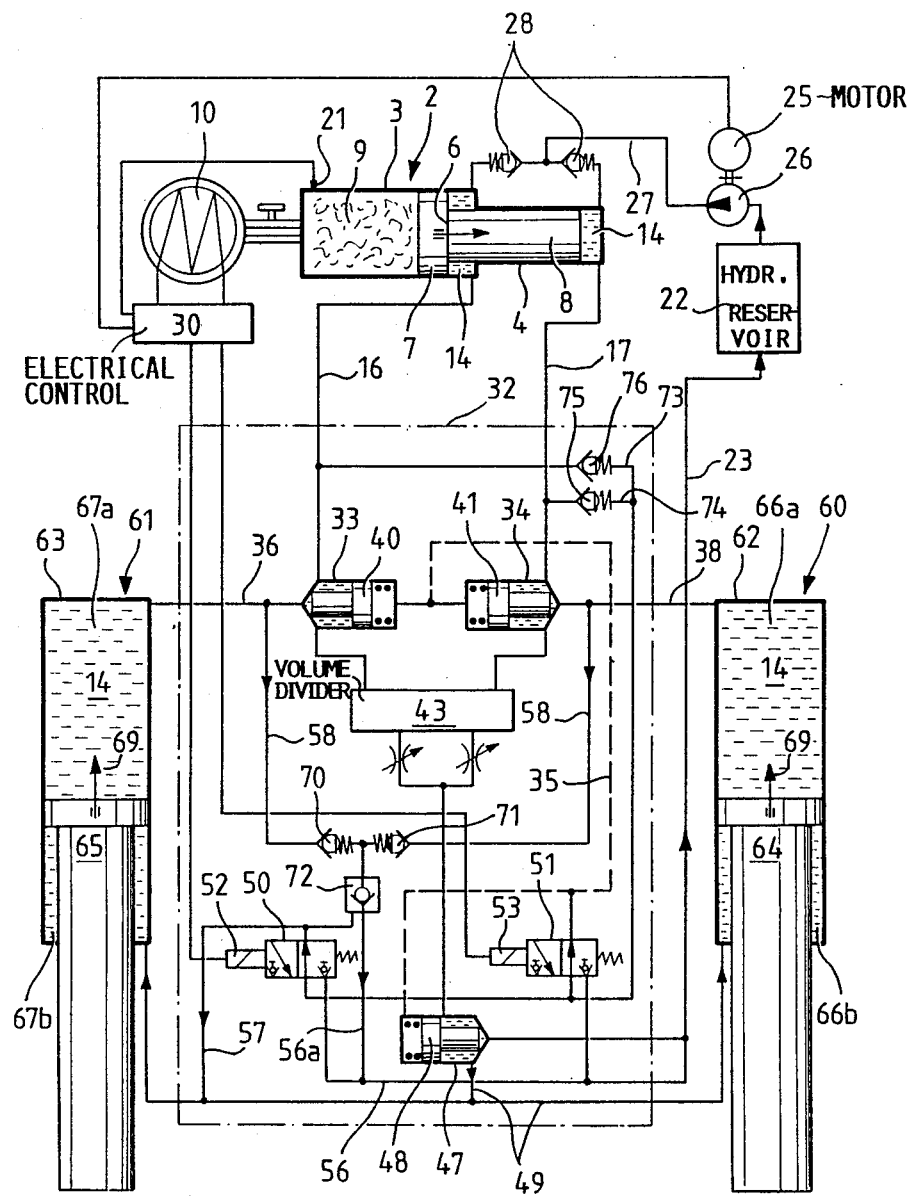
FIG. 2 shows the mechanism according to FIG. 1, in the condition when the ejector piston is being pushed back.

FIGS. 1 and 2 show an ejecting mechanism 1, wherein a double cylinder 2 has two cylinder sections 3 and 4 having different diameters. A double piston 6 with piston sections 7 and 8 is movable within the double cylinder 2 in response to the driving or pressurized gas 9. The pressurized gas 9 is stored in a high pressure gas bottle 10 equipped with a heater 11 and surrounded by heat insulation 12. The double piston 6 driven by the bottle 10 holds, for example, nitrogen as a driving gas. The pressurized gas 9 in the direction of the arrow 13 drives in turn the hydraulic liquid, such as oil 14, with the piston section 7 out of the cylinder section 3 into a conduit 16 and with its piston section 8 oil out of the cylinder section 4 into a conduit 17. A conduit 18 connects the gas bottle 10 with the double cylinder 2 to convey the pressurized gas into the double cylinder 2. The conduit 18 is insulated against heat loss by an insulation 19. A membrane 20 having a determined bursting strength is connected to the conduit 18 to avoid the development of excessive pressure in the pressurized gas 9. A sensor 21 generates a signal for limiting the return stroke of the double piston 6. A hydraulic reservoir 22 has an inlet connected to a supply conduit 23 and an outlet connected to a discharge conduit 24 leading to the suction inlet of a high pressure pump 26 driven by an electric motor 25. The pressure output of the pump 26 is connected through a conduit 27 and through check valves or non-return valves 28 to the cylinder sections 3 and 4. More specifically, a first check valve 28 connects through a conduit 27a to the cylinder section 3 and a second check valve 28 connects through a conduit 27b to the cylinder section 4. An electrical control 30 controls the heater 11, the pump drive motor 25 and the sensor 21 thereby supplying current to the heater 11 through electrical conductor 31 and to the pump 25 through electrical conductor 32. Conductor 33 supplies a sensor signal from the sensor 21 to the control 30, which controls the ejector mechanism in accordance with the respective type of operation as will be described in more detail below.

Conduits 16 and 17 connect the cylinder sections 3 and 4 respectively to a hydraulic valve system 32. The conduits 16 and 17 are connected to two hydraulically controlled valves 33 and 34 which are of the built-in type. The valve 33 has a plug or piston 40 cooperating with its valve seat. Similarly the valve 34 has a piston 41 cooperating with the valve seat. A control conduit shown as a dashed line 35 connects to valve inlets surrounded by the respective valve seat. A conduit 36 connects an outlet of the valve 33 to a cylinder 63 of an ejector 61. A further conduit 37 leads from the valve 33 to a three-way volume divider valve 43. Similarly, a conduit 38 connects the valve 34 to a cylinder 62 of the ejector 60. A conduit 39 connects the valve 34 to the three-way volume or quantity divider 43. The valve pistons 40 and 41 in the built-in valves 33 and 34 are displaced depending on which of the respective conduits 16, 17 and 35 are under pressure. The above mentioned three-way volume or quantity divider 43 is of conventional construction and connected to two measuring throttling devices 44 and 45. A conduit 46 connected in common to the throttling devices 44 and 45 leads to a further built-in valve 47 having a valve seat cooperating with the respective piston 48. The oil flows are divided or rather distributed to the conduits in accordance with the respective instantaneous requirements. For this purpose, there are provided two valves 50 and 51 which are of the so-called three/two-way type. These valves have three connections and two switchable positions. These three/two-way valves 50 and 51 are operated respectively by solenoids 52 and 53. The solenoids 52 and 53 are energized through electrical conductors 54 and 55 connecting these solenoids to the control 30. The operation of these valves 50 and 51 and the respective non-return valves 70, 71 and 72 will be described below with reference to the operation of the ejector mechanism 1.

The ejector mechanism 1 comprises two ejectors 60 and 61 each including cylinders 62 and 63 with pistons 64 and 65 having stepped diameters for ejecting an ammunition body not shown. The piston 64 has a large diameter relatively short section 64a fitting into the cylinder 62 and a relatively long smaller diameter section 64b. Similarly, the piston 65 has a short large diameter section 65a fitting into the cylinder 63 and a longer smaller diameter section 65b. The small diameter sections 64b and 65b engage an ammunition body for its ejection, as is conventional. As mentioned above, the cylinder volume 67a of the cylinder 63 is connected to the built-in valve 33 through the conduit 36. Similarly, the cylinder volume 66a is connected to the built-in valve 34 through the conduit 38. A conduit 49 connects the built-in valve 47 to the ring cylinder chambers 66b and 67b of the cylinders 62 and 63 respectively.

FIG. 1 illustrates the operational state at the beginning of an ejection of an ammunition body, such as a rocket. In this stage, pressurized gas 9 flows from the high pressure bottle 10 through the duct or conduit 18 into the double cylinder 2 thereby driving the piston 6 in the direction of the arrow 13 to the right. As a result, hydraulic oil 14 flows out of the double cylinder sections 3 and 4 into the conduits 16 and 17, thereby pressing the valve pistons 40 and 41 of the built-in valves 33 and 34 into the illustrated position, so that the hydraulic oil can also flow through the conduits 36 and 38 into the upper cylinder spaces 67a and 66a of the ejectors 61 and 60, thereby pressing the ejector pistons 64a and 65a in the direction of the arrow 68. The three/two-way valves 50 and 51 are switched into the shown position by the energizing of the solenoids 52 and 53 operated by the electrical control 30, whereby the valves 50 and 51 are connected with each other through a conduit 56 and through conduits 35, 57 and 49 with the built-in valves 33, 34 and 47 as well as with the ring spaces 66b and 67b of the ejector cylinders 62 and 63 respectively. The built-in valve 47 is connected to the hydraulic reservoir 22 through the conduit 23. As a result, the ring cylinder spaces 66b and 67b are also connected through the valve 50 with the reservoir 22 in case the built-in valve 47 malfunctions. At this time a check valve 72 arranged between the check valves 70 and 71 is closed, whereby hydraulic oil is prevented from flowing out of the upper cylinder spaces 66a and 67a and hence cannot enter into the reservoir 22. The check valves 70 and 71 prevent a flow of hydraulic oil between the cylinder chambers 66a and 67a through the conduit 58. However, a hydraulic positive coupling of the two cylinder spaces 66a and 67a is assured through the double cylinder 2, whereby possible external load disturbances, for example, aero-dynamic load disturbances or frictional load disturbances are compensated. Two further oil pressure conduits 73 and 74 connect to the main pressure conduits 16 and 17. These conduits 73 and 74 each comprise a check valve 75 and 76 respectively. These conduits 73 and 74 are connected to the three/two-way valves 50 and 51 and these valves are closed during the operation "ejection".

The three-way volume or quantity divider 43 is effective only during the operation "ejection". Small partial flows out of the pressurized oil flows are supplied to the three-way quantity divider 43 and to the measuring throttles 44 and 45 through the built-in valves 33 and 34 and through the conduits 37 and 39. Due to the construction of the three-way quantity or volume divider 43 with a pressure balance closed loop control piston and two variable throttles in combination with the measuring throttles 44 and 45 it is possible to vary the quantity of th oil streams flowing to the ejectors 60 and 61, whereby a pitching speed is imparted to the ammunition body being ejected. This imparting of a pitching speed to the ejected ammunition body can be accomplished manually by a pre-adjustment or it may be accomplished by an electrical control during flight. For this purpose the measuring throttles 44 and 45 are connected to the electrical control 30 for providing a throttle adjustment, the adjustment as such is conventional and hence not shown. Due to the built-in pressure balance closed loop control piston in the divider 43 it is possible to make the preselected pitching speed substantially independent of any work pressure fluctuations at the two ejectors 60 and 61. The oil coming out of the three-way volume divider 43 flows without pressure through the conduit 46, the built-in valve 47, and the conduit 23 into the hydraulic reservoir 22.

The operational state "push back" of the ejector pistons 64 and 65 will now be described with reference to FIG. 2. When the ammunition body has been ejected the double piston 6 comes to a stop just ahead of its end position. The energy still available in the pressurized oil 14 during the final portion of the stroke of the piston 6 is used for pushing the ejector pistons 64 and 65 back into the starting position as indicated by the arrow 69. The two three/two-way valves 50 and 51 are switched off electrically, whereby the respective reset springs of these valves shift the valves 50 and 51 into the second switched position shown in FIG. 2. As a result, the oil streams out of the conduits 16 and 17 are led through the conduits 73 and 74 and through the check valves 75 and 76 as well as through the three/two-way valve 51 into the conduit 35 shown by a dashed line. Therefore, the valve pistons 40 and 41 as well as 48 in the built-in valves 33, 34 and 47 are displaced, whereby the supply of pressurized oil in the conduits 36 and 38 to the upper cylinder spaces 67a and 66a is interrupted. Simultaneously pressurized oil passes through the three/two-way valve 50 and the conduit 57 into the ring cylinder spaces 66b and 67b. Pressurization of the cylinder spaces causes the ejector pistons 64 and 65 to be pushed back in the direction of the arrow 69. Simultaneously, the check valve 72 which is of the unlockable type, receives fluid under pressure through the three/two-way valve 50, whereby the check valve 72 is opened for a return-flow. As a result, oil pressed out of the upper cylinder spaces 66a and 67a of the ejectors 60 and 61 can now flow through the conduits 36 and 38 as well as the conduits 58, the check valves 70, 71 and 72 and the conduits 56a, 56, and 23 back into the hydraulic reservoir 22, whereby the latter is being refilled.

During the portion "reactivation" of the operational cycle the built-in valves 33, 34 are closed, the ejector mechanism 1 is reactivated by causing the electromotor 25 to drive the high pressure pump 26 in response to a signal from the control 30. When the motor 25 drives the pump 26, oil is pumped from the reservoir 22 through the conduit 27 and the check valves 28 as well as the respective conduits 27a and 27b into the cylinder chambers 3 and 4. This pressurization of the cylinder chambers 3 and 4 pushes the piston sections 7 and 8 of the double piston 6 back into the position shown in FIG. 1, whereby the working gas is simultaneously highly compressed and returned into the high pressure gas bottle 10. The leftward motion of the piston 6 is limited by the sensor 21, which as such is conventional. Thus, the pressurized gas in the high pressure gas bottle 10 has been returned into its starting condition, as far as its pressure and its volume is concerned, so that this reactivation makes the mechanism 1 ready for a further ejection.

Although the invention has been described with reference to specific example embodiments it will be appreciated that it is intended to cover all modifications and equivalents within the scope of the appended claims.

What we claim is:

1. An ejector mechanism for ejecting an ammunition body from an ammunition carrier, comprising twin ejector means for ejecting an ammunition body, a control system for controlling the operation of said ejector mechanism, said control system including a double piston cylinder device, a hydraulic valve circuit, a hydraulic reservoir, hydraulic pump means, and hydraulic conduit means to form said control system, said mechanism further including a normally pressurized gas source connected to said double piston cylinder device for driving a double control piston in a forward control direction, said hydraulic pump means driving said double piston in a reverse direction, said ejector mechanism further comprising heater means for heating said pressurized gas source to a uniform temperature to keep the energy content of said pressurized gas source approximately constant independently of any external temperature.

2. The mechanism of claim 1, wherein said heater means including means having a heating capacity sufficient for keeping said pressurized gas source at an operating temperature corresponding approximately to the highest occurring external temperature.

3. The mechanism of claim 2, wherein said pressurized gas source is a high pressure gas bottle containing a driving gas, e.g. nitrogen, said heater means being arranged for heating said high pressure gas bottle to said operating temperature, said high pressure gas bottle comprising a heat insulation to make sure that said driving gas enters into said double piston cylinder device at said operating temperature.

4. The mechanism of claim 1, wherein said twin ejector means comprise two ejector cylinders and an ejector piston in each ejector cylinder, each ejector piston having a short section with a large diameter fitting into its respective ejector cylinder and a long section with a diameter smaller than said large diameter for ejecting said ammunition body.

5. The mechanism of claim 4, wherein each ejector cylinder has first and second ports connected to said hydraulic valve circuit for driving said ejector pistons first in an ejecting direction and then in a return direction, whereby one port functions as an inlet port while the other functions as an outlet port and vice versa.

6. The mechanism of claim 1, wherein said double piston cylinder device comprises a double cylinder in which said double piston is movable back and forth, said double piston having a large diameter section and a small diameter section, said double cylinder having a large diameter and a small diameter cylinder section with diameters for receiving said large and small diameter piston sections, said large diameter cylinder section being connected to said pressurized gas source for applying pressurized gas to one end of said large diameter piston section, both cylinder sections having approximately the same volume excluding the piston volume, each cylinder section having at an end thereof an inlet port for hydraulic fluid and an outlet port for hydraulic fluid, whereby pressurized hydraulic fluid is driven to said hydraulic valve circuit through said outlet ports in response to the admission of pressurized gas to said one end of said large diameter piston section, and whereby gas is repressurized in response to admission of pressurized hydraulic fluid through said inlet ports.

7. The mechanism of claim 6, wherein said outlet ports are connected to said hydraulic valve circuit, and wherein said mechanism further comprising check valves for connecting said inlet ports to said hydraulic pump means for refilling said cylinder sections, said pump means including an electric motor.

8. The mechanism of claim 1, wherein said hydraulic valve circuit comprises three hydraulically controlled built-in valves having valve plugs cooperating with respective valve seats, a three-way volume divider, two measuring hydraulic throttles, two three/twoway valves, solenoids for operating said three/two-way valves, a check valve switchable for return flow, and four non-return check valves, all interconnected by said hydraulic conduit means to form said hydraulic valve circuit.

9. The mechanism of claim 8, wherein said control system comprises a piston end position sensor in said double piston cylinder device and an electrical control for automatically operating said two three/two-way valves and said hydraulic pump means in response to said end position sensor, said electrical control also automatically controlling said heater means for said pressurized gas source to keep said gas source at a predetermined temperature.

10. The mechanism of claim 1, wherein pressurized gas from said pressurized gas source drives said double control piston to first operate said twin ejector means in an ejecting direction and then in a return direction, whereby a larger proportion of a stroke in said forward control direction causes movement of said twin ejector means in said ejecting direction, while a smaller proportion of said stroke causes movement of said twin ejector means in said return direction for returning said twin ejector means into a position ready for a next operation cycle.

11. The mechanism of claim 10, wherein hydraulic fluid pressed out of said twin ejector means during movement in said return direction passes through said hydraulic valve circuit into said hydraulic reservoir.

12. The mechanism of claim 11, wherein operation of said hydraulic pump means pushes hydraulic fluid out of said hydraulic reservoir into both cylinder sections of said double piston cylinder device, whereby movement of said double piston in said reverse direction repressurizes said gas source by returning operating gas into said gas source, said control system further comprising piston position sensor means located near an end of said double piston cylinder device for providing a control signal for stopping said hydraulic pump means to limit movement of said double piston in said reverse direction.

* * * * *